(12) United States Patent
Fogarty

(10) Patent No.: US 10,095,901 B1
(45) Date of Patent: Oct. 9, 2018

(54) CONTENT VERIFICATION SYSTEM FOR OPAQUE SEALED CONTAINERS

(71) Applicant: Bliss Distribution Inc, Orinda, CA (US)

(72) Inventor: Matthew John Fogarty, Orinda, CA (US)

(73) Assignee: BLISS DISTRIBUTION INC., Orinda, CA (US)

( * ) Notice: Subject to any disclaimer, the term of this patent is extended or adjusted under 35 U.S.C. 154(b) by 0 days.

(21) Appl. No.: 15/421,277

(22) Filed: Jan. 31, 2017

Related U.S. Application Data

(60) Provisional application No. 62/388,825, filed on Feb. 9, 2016.

(51) Int. Cl.
| | |
|---|---|
| *G06K 7/10* | (2006.01) |
| *G06Q 30/00* | (2012.01) |
| *G09F 3/00* | (2006.01) |
| *G06F 17/30* | (2006.01) |
| *G09F 3/02* | (2006.01) |

(52) U.S. Cl.
CPC ....... *G06K 7/10861* (2013.01); *G06Q 30/018* (2013.01); *G09F 3/0291* (2013.01); *G09F 3/0297* (2013.01); *G06F 17/30879* (2013.01); *G09F 2003/0213* (2013.01); *G09F 2003/0272* (2013.01)

(58) Field of Classification Search
CPC G06K 7/10861; G06Q 30/018; G09F 3/0291; G09F 3/0297; G09F 2003/0213; G09F 2003/027; G06F 17/30879
See application file for complete search history.

(56) References Cited

U.S. PATENT DOCUMENTS

| | | | | |
|---|---|---|---|---|
| 6,036,017 | A | * | 3/2000 | Bayliss, IV ............... A61J 1/03 206/459.5 |
| 6,102,224 | A | * | 8/2000 | Sun .................... B65D 41/3428 215/252 |
| 6,370,222 | B1 | * | 4/2002 | Cornick, Jr. ......... G01V 5/0016 378/57 |
| 7,002,472 | B2 | | 2/2006 | Stratmoen et al. |
| 8,145,501 | B1 | * | 3/2012 | Heald ..................... G06F 19/00 705/2 |
| 8,756,998 | B1 | | 6/2014 | Joplin |
| 2003/0205897 | A1 | * | 11/2003 | Kaufman ............... B42D 15/00 283/117 |
| 2005/0128087 | A1 | | 6/2005 | Claessens et al. |

(Continued)

*Primary Examiner* — Thien M Le
*Assistant Examiner* — Asifa Habib
(74) *Attorney, Agent, or Firm* — Evergreen Valley Law Group; Kanika Radhakrishnan

(57) ABSTRACT

A method, system, and database for facilitating verification of a content of a sealed container are provided. The method includes receiving one or more images of the content of the sealed container. The one or more images of the content are captured prior to sealing the content in the sealed container. A unique code is associated with the one or more images of the content. The unique code is printed for affixing the printed unique code on an exterior of the sealed container. Storage of the one or more images and the unique code is facilitated in a database. The one or more images are retrievable from the database based on providing the unique code to the database.

4 Claims, 9 Drawing Sheets

(56) References Cited

U.S. PATENT DOCUMENTS

| | | | |
|---|---|---|---|
| 2013/0175335 A1* | 7/2013 | Roberts | G06F 17/30823 235/375 |
| 2015/0102100 A1* | 4/2015 | Hattrup | G06Q 50/28 235/375 |
| 2016/0009468 A1* | 1/2016 | Rancien | B65D 51/185 215/230 |
| 2016/0203389 A1* | 7/2016 | Zhen | G06Q 10/10 382/218 |
| 2016/0267570 A1* | 9/2016 | Hodges | G06Q 30/0623 |
| 2016/0378877 A1* | 12/2016 | Khemka | G06F 17/30879 235/375 |
| 2017/0032311 A1* | 2/2017 | Rizzolo | G06Q 20/201 |
| 2017/0108577 A1* | 4/2017 | Loverich | G01S 5/0284 |
| 2017/0318166 A1* | 11/2017 | Wall Warner | H04L 29/06 |

* cited by examiner

| UNIQUE CODE 402 | WEBLINK 404 | NAME OF THE CONTENT 406 | DESCRIPTION 408 | DATE OF MANUFACTURE 410 | ANCILLARY INFORMATION 412 | IMAGE 1 414a | IMAGE 2 414b | ......... | IMAGE n 414n |

CONTENT VERIFICATION SYSTEM FOR OPAQUE SEALED CONTAINERS

TECHNICAL FIELD

The present application generally relates to verifying content of containers, and more particularly to verifying content of opaque sealed containers.

BACKGROUND

Materials such as foodstuffs, pharmaceutical products, botanical extracts and the like usually deteriorate when exposed to light and air. Hence such materials are usually packed in hermetically sealed opaque containers such as a metal can so that damage caused due to atmospheric contact, light exposure, oxidation, and dehydration may be reduced. As a result long shelf life and high quality of the materials is achieved.

However a product that is packed in an opaque sealed container cannot be viewed by a customer of the product prior to purchase. As products such as herbs and other unprocessed botanical products vary significantly from one sealed container to another sealed container, it becomes pertinent for the customer to visualize the product prior to the purchase in order to determine a quality of the product. Opening the opaque sealed container to enable the customer to view the product, may result in damaging the product due to exposure to light and air. Several methods exist to enable the customer to view contents of an opaque sealed container prior to the purchase. However, these methods suffer from one or more drawbacks as discussed below.

An existing method includes placing a representative photograph(s) of the contents of opaque sealed containers on an exterior of the opaque sealed containers. However, such representative photograph(s) do not show an actual image of the contents, but rather a representative image of a type of the contents. As a result, the customer may not be able to judge a quality of the contents by viewing the representative image. An actual quality of the contents may differ from a quality of the contents estimated by viewing the representative image, thereby resulting in a dissatisfied purchase.

Another existing method includes placing a translucent cover or using a translucent material such as a plastic film or a glass film over a part of the exterior of the opaque sealed container. The buyer may view the contents through an area of the opaque sealed container that comprises the translucent cover or the translucent material. However, passage of light through the translucent cover or the translucent material may lead to damage of the contents. Further, the translucent materials such as the plastic film or the glass film are usually fragile and expensive over metallic materials and hence may be avoided by a typical manufacturer of the opaque sealed containers.

Therefore, there is a need for techniques for enabling verification and inspection of the contents of the opaque sealed containers in an effective manner.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, a method for facilitating verification of a content of a sealed container is disclosed. The method includes receiving one or more images of the content of the sealed container. The one or more images of the content are captured prior to sealing the content in the sealed container. The method includes associating a unique code with the one or more images of the content. The method facilitates printing of the unique code, for affixing the printed unique code on an exterior of the sealed container. The method includes facilitating storage of the one or more images and the unique code in a database. The one or more images are retrievable from the database based on providing the unique code to the database.

In an embodiment, a method for verifying a content of a sealed container is disclosed. The method includes accessing, by a processor of an electronic device, a unique code associated with the content of the sealed container. The unique code is affixed on an exterior of the sealed container. The method includes sending, by the processor, a request associated with the unique code to a database. The database stores one or more images of the content corresponding to the unique code. The one or more images of the content are captured prior to sealing the content in the sealed container. The method includes retrieving, by the processor, the one or more images associated with the unique code from the database. The method includes facilitating, by the processor, display of the retrieved one or more images at a display screen associated with the electronic device.

In an embodiment, a system for facilitating verification of a content of a sealed container is disclosed. The system includes at least one processor and at least one memory comprising computer program code, the at least one memory and the computer program code configured to, with the at least one processor cause the system to receive one or more images of the content of the sealed container. The one or more images of the content are captured prior to sealing the content in the sealed container. The system is caused to associate a unique code with the one or more images of the content. The system is caused to facilitate printing of the unique code, for affixing the printed unique code on an exterior of the sealed container. The system is further caused to facilitate storage of the one or more images and the unique code in a database. The one or more images are retrievable from the database based on providing the unique code to the database.

In an embodiment, a database for facilitating verification of a content of a sealed container is disclosed. The database includes an input/output interface for receiving one or more images and a unique code. The one or more images correspond to the content of the sealed container. The one or more images are captured prior to sealing the content in the sealed container. The database includes one or more storage locations for storing the one or more images and the unique code. The input/output interface is configured to provide the one or more images to an electronic device upon receiving an electronic request comprising the unique code from the electronic device.

Many of the attendant features will be more readily appreciated, as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or used. However, the same or equivalent functions and sequences may be accomplished by different examples.

Various embodiments of the present disclosure provide a method, system and a database that are capable of overcoming these and other obstacles and providing methods, systems, and a database for facilitating verification of a content of the sealed container. The term "content" as used herein refers to things, materials, pieces packaged within the sealed container. For example the content may include foodstuffs, pharmaceutical products, botanical extracts, herbs and such other materials. It may be noted that, the terms "content" and "contents" maybe used interchangeably herein.

By employing the embodiments of the present disclosure, a user (e.g., purchaser or customer) may view and inspect one or more images of the contents of the sealed container without actually opening the sealed container. The user is provided access to a unique code available on an exterior of the sealed container. The unique code may be used by the user to access the one or more images from a database. For instance, the one or more images may be downloaded into an electronic device operable by the user. The one or more images may include a high resolution image. The user may magnify the one or more images on the electronic device to inspect and view a magnified view of the contents for verifying the contents. Various embodiments of the present disclosure are now described in detail using various figures.

An example environment for facilitating verification of the contents of the sealed containers is explained with reference to FIGS. 1A-1B.

Figure 1A:
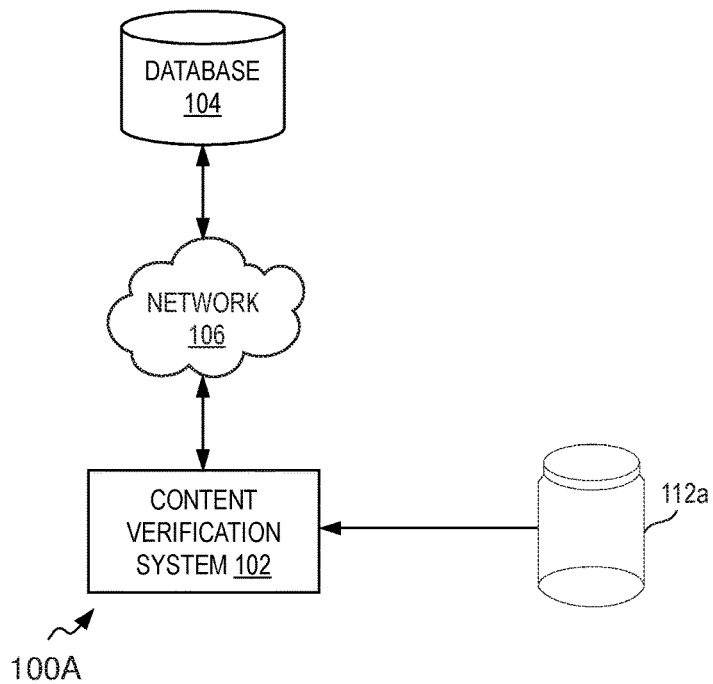
FIGS. 1A-1B illustrate example environments, where various embodiments of the present disclosure may be practiced.

FIG. 1A illustrates an example environment 100A, where at least some embodiments of the present disclosure may be practiced. The environment 100A is depicted to include a content verification system 102, a network 106, and a database 104. In an example, the content verification system 102 is deployed at a location where packaging (or sealing) of the content in a sealed container 112a, is performed. The content verification system 102 may be connected to the database 104 via the network 106. The network 106 may be a private network, a public network, a LAN, a wireless network, a Bluetooth based network, a cloud network, or any such type of network. The database 104 may be a distributed database, a centralized database or a database server accessible over the network 106 and configured to store data provided by the content verification system 102.

The content verification system 102 is configured to facilitate verification of the contents of sealed containers, for example, contents of a sealed container 112a as shown. For instance, the content verification system 102 facilitates storing images of the contents prior to sealing the contents in the container 112a, where the images are stored in the database 104. The content verification system 102 also facilitates in generation of a unique code and affixing the unique code at an exterior of the container 112a. The unique code can be used by a user of an electronic device (see, FIG. 1B) to access the images of the contents from the database 104. Some example embodiments of the content verification system 102 are hereinafter explained, and especially with reference to FIG. 2.

Figure 1B:
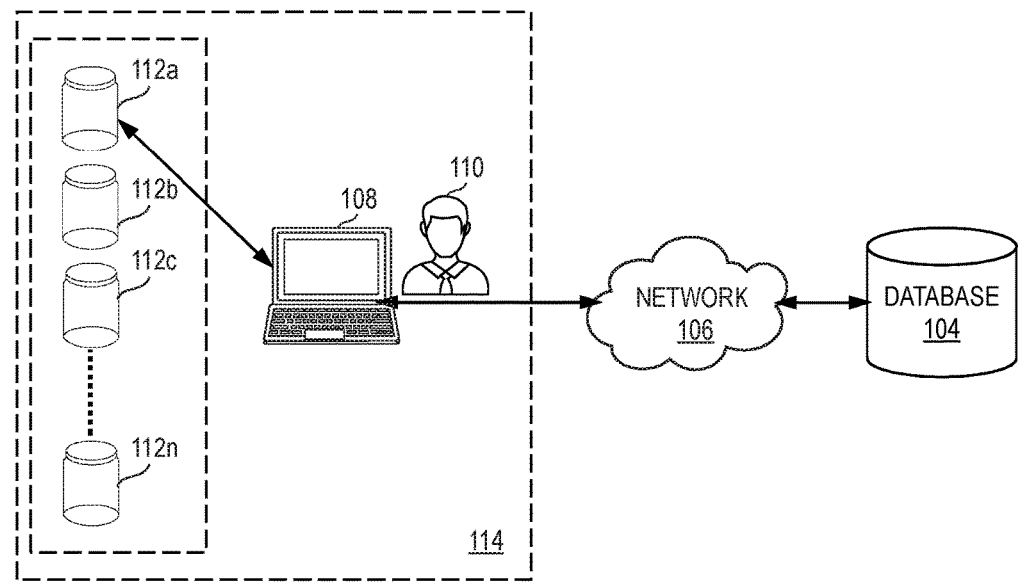

FIG. 1B illustrates an example environment 100B, where at least some embodiments of the present disclosure may be practiced. Specifically, the environment 100B represents an example set up where a user (e.g., customer or purchaser) can verify the contents of a sealed container. The environment 100B is depicted to include the user 110, the network 104, and the database 104. The user 110 may be a customer at a store 114 engaged in purchasing products packed in sealed containers 112a, 112b, 112c to 112n, hereinafter referred to as 112a-n. The store 114 may be a retail outlet, a grocery store, a medical shop, and the like where products are sold in the sealed containers 112a-n. It is noted that the environment 100B is shown to include a single user, viz. the user 110, and a single store, the store 114, but the environment 100B may include several such users engaged in purchasing products from several such stores. Each user may be associated with an electronic device capable of facilitating communication with other entities of the environment 100B via the network 106. Examples of the electronic device 108 may include, but are not limited to, laptops, desktops, smart watches, tablet devices, smart televisions, smart devices, wearable devices, personal digital assistants (PDAs) and the like.

For example, the user 110 is connected to the network 106 via the electronic device 108 (exemplarily depicted to be a tablet device). The electronic device 108 may be connected to the network 106 using, a private network, a public network, a LAN, a wireless network, a Bluetooth based network, or any such type of network. Further, the electronic device 108 may be connected to the database 104 via the network 106. In some embodiments, the electronic device 108 may be a device already present (e.g., fixed or portable) in the store 114 and such device may be used by the user 110 to verify the contents in any of the sealed containers 112a-n. One example of such device may be an electronic kiosk or display booth.

The network 106 may be a centralized network or may comprise a plurality of sub-networks that may offer a direct communication between the entities or may offer indirect communication between the entities. Examples of the network 106 may include wireless networks, wired networks, and combinations thereof. Some non-exhaustive examples of wireless networks may include wireless local area networks (WLANs), Bluetooth networks, cellular networks and the like. Some non-exhaustive examples of wired networks may include Local Area Networks (LANs), Ethernet, Fiber Optic networks and the like. A combination of wired networks and wireless networks may include, for example, the Internet.

In an example embodiment, the user 110 of the electronic device 108 may seek to verify or inspect the contents of a sealed container for example, the sealed container 112a prior to making a purchase of the contents stored in the sealed container 112a. In an example embodiment, the user 110 may be a customer engaged in verifying or inspecting the contents of the sealed container 112a, prior to a purchase. In another example embodiment, the user 110 may be a store assistant of the store 114, and the electronic device 110 may be a desktop or a laptop associated with the store 114. The store assistant may scan or read a unique code (see, unique code 306 in FIG. 3) on behalf of a customer seeking to verify or inspect the content of the sealed container 112a prior to the purchase.

To facilitate the verification or inspection of the contents of the sealed container 112a, the unique code 306 affixed on the exterior of the sealed container 112a may be accessed by the electronic device 108. Verification of the content of the sealed container 112a using the unique code 306 is explained hereinafter and especially with reference to FIG. 5.

Figure 2:
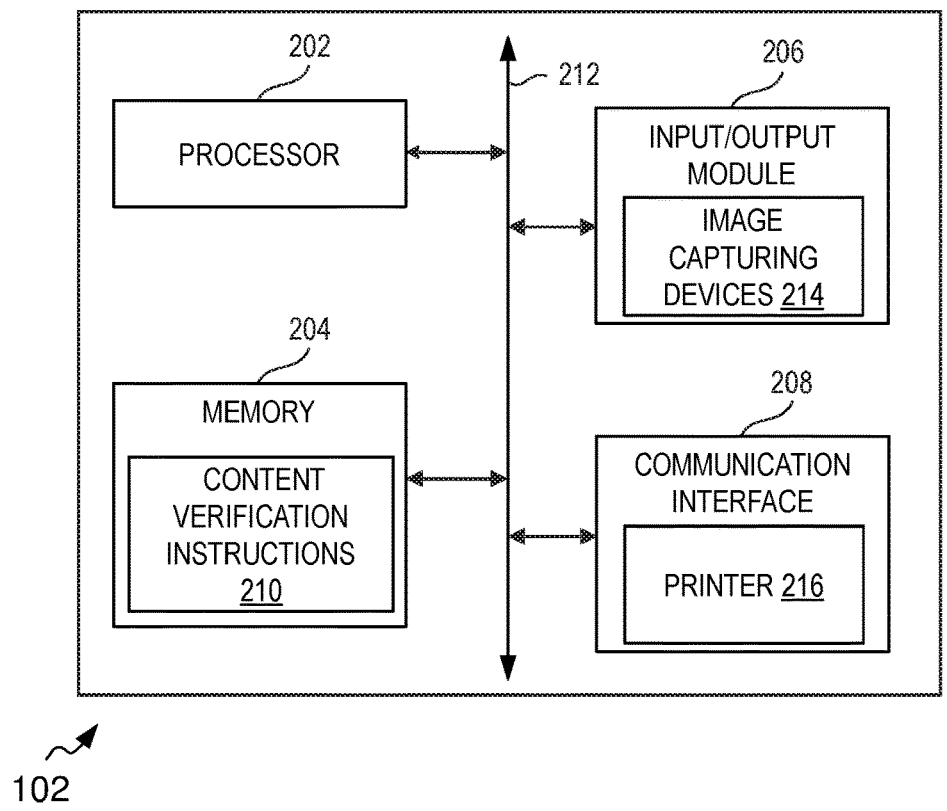
FIG. 2 is a block diagram of a content verification system configured to facilitate verification of a content of a sealed container, in accordance with an example embodiment.

FIG. 2 illustrates the content verification system 102 configured to facilitate verification of the contents of the sealed container 112a. The content verification system 102 includes a system 200, a printer 216 and an image capturing device 214. The system 200 further includes at least one processor such as a processor 202, at least one memory such as a memory 204, an input/output (I/O) module 206 and a communication interface 208. Although the system 202 is depicted to include only one processor 202, the system 200 may include more number of processors therein. In an embodiment, memory 204 is capable of storing content verification instructions 210. Further, the processor 202 is capable of executing the stored content verification instructions 210.

In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, and the like. In an embodiment, the processor 202 may be configured to execute hard-coded functionality. In an embodiment, the processor 202 may be embodied as an executor of software instructions, wherein the software instructions may specifically configure the processor 202 to perform algorithms and/or operations described herein when the software instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The I/O module 206 is configured to facilitate provisioning of an output to a user of the system 200 and/or for receiving an input from the user of the system 200. The I/O module 206 is configured to be in communication with processor 202 and memory 204. Examples of the I/O module 206 include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a microphone, a speaker, a ringer, a vibrator, a light emitting diode display, a thin-film transistor (TFT) display, a liquid crystal display, an active-matrix organic light-emitting diode (AMOLED) display, and the like. In an example embodiment, the processor 202 may include I/O circuitry configured to control at least some functions of one or more elements of I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

The communication interface 208 enables the system 200 to communicate with other entities over various types of wired, wireless or combinations of wired and wireless networks, such as for example, the Internet. In at least one example embodiment, the communication interface 208 includes a transceiver circuitry configured to enable transmission and reception of data signals over the various types of communication networks. In some embodiments, the communication interface 208 may include appropriate data compression and encoding mechanisms for securely transmitting and receiving data over the communication networks. The communication interface 208 facilitates communication between the system 200, the printer 216, the image capturing device 214 and the database 104, as shown in FIG. 1A.

In an embodiment, various components of the system 200, such as the processor 202, the memory 204, the I/O module 206 and the communication interface 208 may be configured to communicate with each other via or through a centralized circuit system 212. The centralized circuit system 212 may be various devices configured to, among other things, provide or enable communication between the components (202-208) of the system 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

The system 200 as illustrated and hereinafter described is merely illustrative of a system that could benefit from embodiments of the invention and, therefore, should not be taken to limit the scope of the invention. It is noted that the system 200 may include fewer or more components than those depicted in FIG. 2. As explained above, the system 200 may be included within or embody an electronic device. Moreover, the system 200 may be implemented as a centralized system, or, alternatively, the various components of system 200 may be deployed in a distributed manner while being operatively coupled to each other.

The image capturing device 214 may be a camera, a video recorder and such electronic device configured to capture images of objects such as the sealed container 112a and generate photographs or images of the objects. It is noted that though the image capturing device 214 is depicted to be in communication with the system 200, in some embodiments, the system 200 may be configured to include the image capturing device 214. In some embodiments, the image capturing device 214 may include only the hardware for capturing image frames, while the memory 204 of the system 200 stores instructions for execution by the processor 202 in the form of software for generating an image output. In an example embodiment, the image capturing device 214 may further include a processing element such as a co-processor that assists the processor 202 in processing image frame data and an encoder and/or decoder for compressing and/or decompressing image frame data. The encoder and/or decoder may encode and/or decode according to a standard format, for example, a Joint Photographic Experts Group (JPEG) standard format.

The printer 216 may be a digital printer or an analog printing device capable of printing one or more images and other data on hard surfaces such as an exterior of the sealed container or on adhesive materials such as labels, stickers, stick-on papers and the like. It is noted that though the printer 216 is depicted to be in communication with the system 200, in some embodiments, the system 200 may be configured to include the printer 216. In some embodiments, the printer 216 may be a three-dimensional printer.

Facilitating verification of contents of sealed containers is explained hereinafter with respect to a single sealed container viz. the sealed container 112a. It is noted that the content verification system 102 may be configured to facilitate verification of contents of a plurality of sealed containers.

Figure 3:
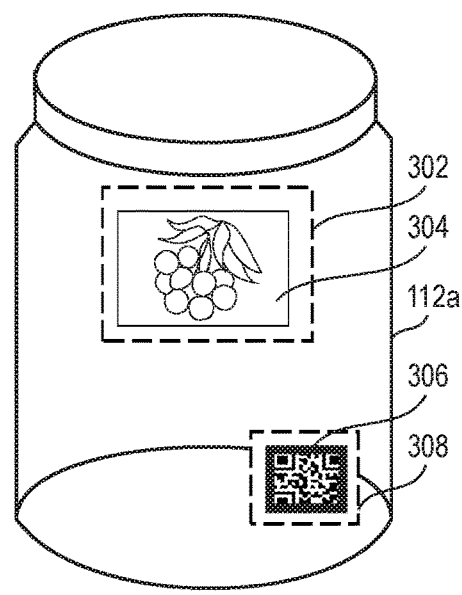
FIG. 3 illustrates the sealed container configured to facilitate the verification of the content, in accordance with an example embodiment.

In at least one example embodiment, the processor 202 is configured to, with the stored instructions 210 of the memory 204, cause the system 200 to receive one or more images of contents of the sealed container 112a. The one or more images of the contents are captured by the image capturing device 214 prior to sealing the contents in the sealed container 112a. The system 200 may receive the captured one or more images from the image capturing device 214 via the communication interface 208. The one or more images may include a high-resolution image. In the at least one example embodiment, the processor 202 is configured to, with the stored instructions 210 of the memory 204, cause the system 200 to associate a unique code with the one or more images of the contents. The unique code may include a two-dimensional code such a QR code, an alphanumeric code, or an encrypted code. The system 200 may further be caused to, facilitate printing of the unique code, for affixing a printed unique code 306 (as shown in FIG. 3) on an exterior of the sealed container 112a. In an example embodiment, the system 200 may communicate via the communication interface 208, the unique code to the printer 216. In an example embodiment, the printer 216 may perform a 2-D or 3-D printing of the unique code on the exterior of the sealed container 112a. In another example embodiment, the printer 216 may print the unique code on an adhesive material such as a label or a sticker 308 (as shown in FIG. 3). The adhesive material may be adhered using an adhering substance such as glue to the sealed container 112a. The unique code may be printed in a human-readable format, a machine-readable format, or a combination of both. An example representation of a sealed container is explained with reference to FIG. 3.

FIG. 3 illustrates the sealed container 112a including the printed unique code 306. The sealed container 112a may typically be an opaque sealed container made of a metallic material such as tin, aluminum, steel or alloys, opaque plastic, fiber and the like, which may block passage of light. The sealed container 112a maybe hermetically sealed such that air and moisture are prevented from entering the sealed container 112a. Further, the unique code 306 may be printed on the label 308, where the label 308 is adhered to the exterior of the sealed container 112a. In an example embodiment, the unique code 306 maybe printed directly via three-dimensional printing process on the exterior of the sealed container 112a.

In an example embodiment, the one or more images of the contents as captured by the image capturing device 214 may be printed by the printer 216, for affixing the one or more printed images (e.g. see, an image 304) on a label 302, as shown. The label 302 may be adhered on the exterior of the sealed container 112a. In an example embodiment, the one or more images of the contents may be printed directly by three dimensional printing on the exterior of the sealed container 112a. Typically, a subset of the one or more images may be printed on the exterior of the sealed container 112a or on the label 302, due to paucity of space available on the exterior of the sealed container 112a. For example, a single image of the captured one or more images may be printed on the exterior of the sealed container 112a or on the label 302. The one or more images (digital images) of the contents that are high resolution images are stored in the database 104, however the one or more printed images, such as the image 304 may usually be of a lower resolution and quality in comparison to the captured one or more images that are stored in the database 104.

Further, the sealed container 112a may include a scratch and sniff label or sticker on the exterior of the sealed container 112a. The scratch and sniff label may typically include an odor similar to an odor of the contents and may be configured to emit the odor when a user scratches the scratch and sniff label. The emitted odor may enable the user to smell the contents without actually opening the sealed container 112a.

The system 200 may be further caused to, facilitate storage of the captured one or more images and the unique code 306 in the database 104 (FIG. 1A). The system 200 may be further caused to, associate a weblink to the unique code 306. The weblink may provide web access to a storage location 506 (as shown in FIG. 5) of the database 104 where the captured one or more images and the unique code 306 are stored. The system 200 maybe further caused to receive supplemental information associated with the contents from an input device associated with the I/O module 206. The system 200 may be caused to authenticate the input device that provides the supplemental information. For example, the input device may include a keyboard, and authentication may include verifying a password inputted by personnel authorized to provide the supplemental information. On successful authentication, the system 200 may facilitate storage of the supplemental information along with the one or more images in the database 104. In an example embodiment, the supplemental information may include name and description of the contents, date of manufacture of the contents, packaging date of the contents and ancillary information, where the ancillary information may include other information pertaining to the content that may be of interest to the user. The one or more images, the unique code 306 and the supplemental information of the contents may be stored as a tuple or a data representation in the storage location 506 as shown in FIG. 4.

Figure 4:
FIG. 4 illustrates a data representation in a storage location of a database configured to store one or more images of the content of the sealed container of FIG. 2, in accordance with an example embodiment.
Figure 5:
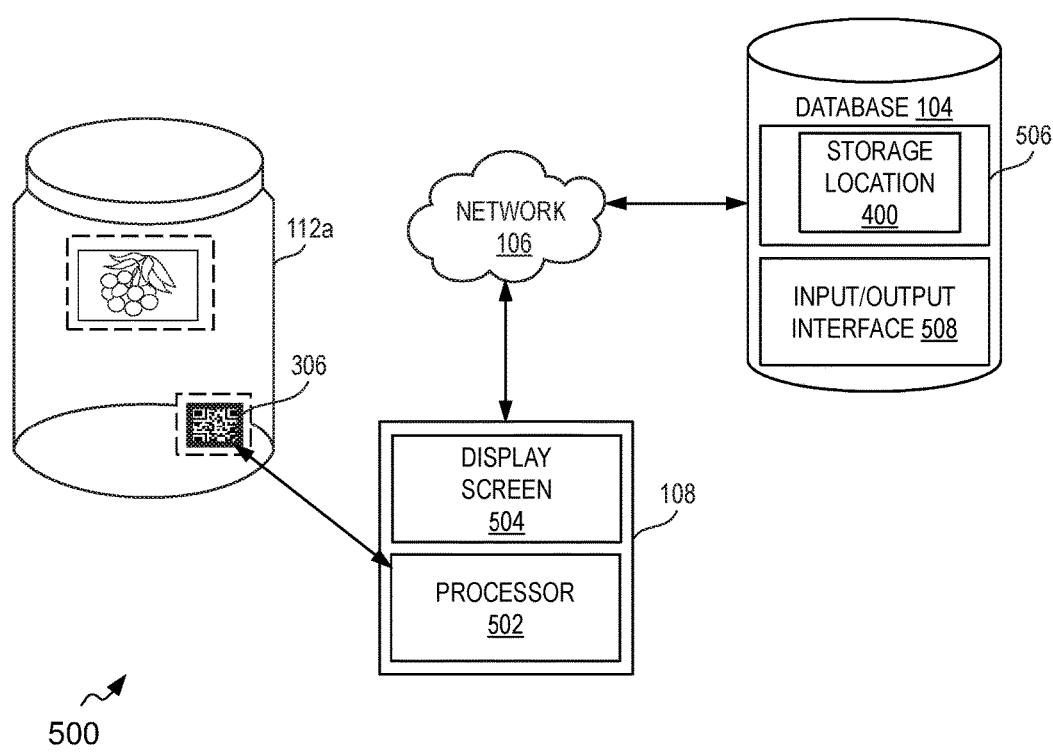
FIG. 5 illustrates an example environment, depicting an electronic device configured to verify the content of the sealed container of FIG. 2, in accordance with an example embodiment.

FIG. 4 illustrates a typical data representation 400 in the storage location 506 of the database 104. The data representation 400 may include a unique code 402, a weblink 404, name 406, description 408, date of manufacture 410, ancillary information 412, and the captured one or more images viz. Image$_1$ 414a, Image$_2$ 414b . . . Image$_n$ 414n. Data provided for storage under the name 406, the description 408, the date of manufacture 410 and the ancillary information 412 may include the supplemental information provided to the database 104. In an example embodiment, the name 406 includes a name of the contents of the sealed container. The description 408 includes a description of the contents, for example, a place of origin of the contents, a place of manufacture, name of the manufacturer, and such information. Further, the date of manufacture 410 may include a date when the contents are manufactured. Further, the ancillary information 412 may include other supporting data pertaining to the contents that may be of interest to the customers.

For example, the unique code 306 of the sealed container may be stored in the storage location 506 as the unique code 402. The weblink associated with the unique code 306 may be stored as the weblink 404. Further, the captured one or more images may be stored as Image$_{1-n}$ 414a-n. Further, the supplemental information inputted in association with the unique code 306 to the system 200 may be stored as the name 406, the description 408, the date of manufacture 410 and the ancillary information 412.

The one or more images 414a-n, and the supplemental information 406-412 stored in the database 104 corresponding to the unique code 402, may be retrieved from the database 104 by providing information associated with the unique code 306 to the database 104. For example, the unique code 306 may be used as a primary key for retrieving the supplemental information 406-412 and the one or more images 414a-n, associated with the contents of the sealed container 112a from the database. In an example embodiment, when an electronic device 108 (as shown in FIG. 1B) operated by a user 110 (see FIG. 1B), accesses the affixed unique code 306 from the exterior of the sealed container 112a, and provides the unique code 306 as an input for the retrieval, the one or more images 414a-n, and the supplemental information 406-412 may be retrieved.

FIG. 5 is an example environment 500, depicting the electronic device 108 configured to verify the contents of the sealed container 112a. The environment 500 includes the electronic device 108, the database 104, the network 106, and a representative sealed container such as the sealed container 112a. The electronic device 108 may include a processor 502, and a display screen 504. Further, the database 104 may include one or more storage locations such as the storage location 506, and an input/output interface 508. The electronic device 108 may communicate with the database 104 via the network 106.

In an example embodiment, the printed unique code 306 may be accessed by capturing an image of the printed unique code 306 by a scanning device, an image capturing device present in or otherwise accessible to the electronic device 108 or any such device. The scanning device or the image capturing device may be included within the electronic device 108 or may be communicatively coupled to the electronic device 108. The accessed unique code 306 is provided to the processor 502 of the electronic device 108. In an example, the printed unique code 306 may be accessed by the scanning device, the image capturing device or any such device usually when the printed unique code 306 is in the machine-readable format. In another example, where the unique code 306 is in a human-readable format such as the alphanumeric code, the unique code 306 may be visually read by the user 110 and inputted into the electronic device 108, and thereby provisioned to the processor 502.

The processor 502 may send, via the network 106, a request associated with the accessed unique code 306 to the input/output interface 508 of the database 104. Sending the request may include determining the weblink associated with the unique code and sending the weblink via the network 106 to the database 104 for accessing the one or more images 414a-n and the supplemental information 406-412 corresponding to the unique code 306. The weblink may point to the storage location 506 of the database where the unique code 402, the captured one or more images 414a-n, and the supplemental information 406-412 associated with the contents of the sealed container 112a are stored. In the example embodiment, the stored unique code 402 corresponds to the printed unique code 306.

On receiving the request including the weblink by the input/output interface 508 of the database 114, the input/output interface 508 may provide the one or more images 414a-n to the electronic device 108. The processor 502 may be caused to retrieve the one or more images 414a-n associated with the unique code 306 from the database 104. In an example embodiment, the processor 502 maybe caused to receive the one or more images 414a-n, provided by the input/output interface 508 via the network 106.

Further, the processor 502, may facilitate display of the retrieved one or more images 414a-n at the display screen 504, associated with the electronic device 108. Further, the processor 502, may retrieve the supplemental information 406-412 associated with the unique code 402 from the database 114. The processor 502, may further, facilitate display of the retrieved supplemental information 406-412 at the display screen 504, as shown. The user 110 may view the one or more images 414a-n on the display screen 504 to inspect the contents of the sealed container. The user 110 may additionally perform zoom or magnify operations on the one or more images 414a-n using typical user interfaces of the electronic device 108, in order to inspect the one or more images 414a-n with higher clarity and detail. The user 110 may be able to judge a quality of the contents on viewing the one or more images 414a-n prior to making the purchase. A method for facilitating verification of a content of a sealed container is explained with reference to FIG. 6.

Figure 6:
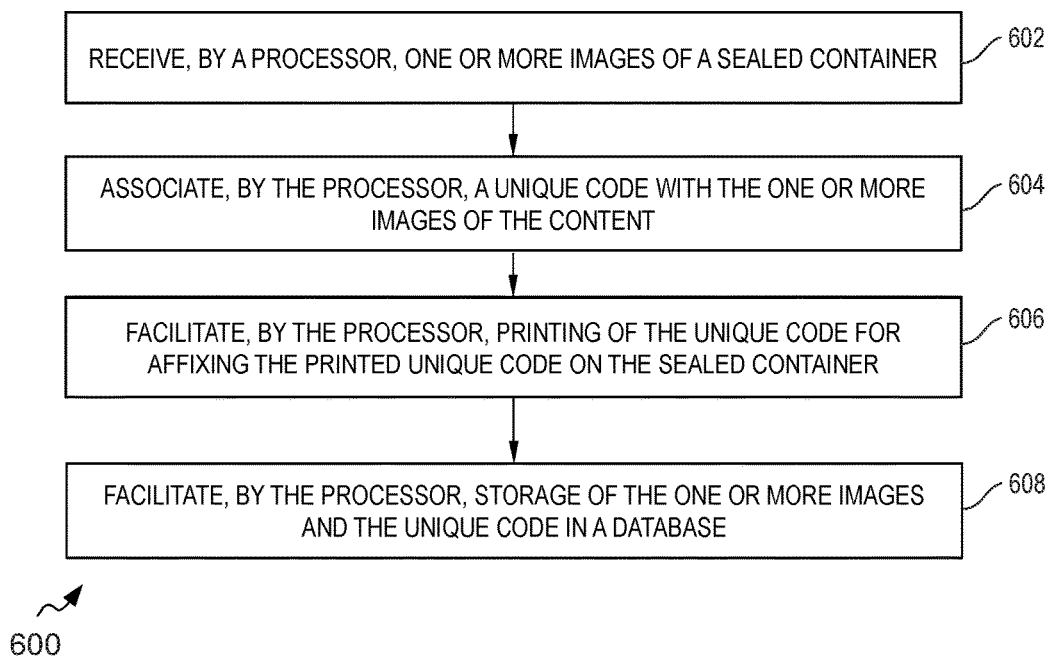
FIG. 6 is a flowchart illustrating a method for facilitating verification of a content of a sealed container in accordance with an example embodiment.

FIG. 6 is a flow diagram of an example method 600 for facilitating content verification of sealed containers, in accordance with an embodiment of the invention. The method 600 depicted in the flow diagram may be executed by, for example, the content verification system 102 explained with reference to FIGS. 1A to 2. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the content verification system 102. For example, one or more operations corresponding to the method 600 may be executed by a processor, such as the processor 202 of the content verification system 102. Although the one or more operations are explained herein to be executed by the processor 202 alone, it is understood that the processor 202 is associated with a memory, such as the memory 204 of the content verification system 102, which is configured to store machine executable instructions for facilitating the execution of the one or more operations. The operations of the method 600 can be described and/or practiced by using a system other than the content verification system 102. The method 600 starts at operation 602.

At operation 602 of the method 600, one or more images of contents of a sealed container is received by a processor such as the processor 202 of the content verification system 102 explained with reference to FIG. 2. The one or more images of the content may be captured prior to sealing the contents in the sealed container. The one or more images may comprise high-resolution images or images of various resolutions.

At operation 604 of the method 600, a unique code is associated with the one or more images of the contents by the processor. The unique code may be one of a two-dimensional code, an alphanumeric code, and an encrypted code, configured to uniquely identify the one or more images of the contents.

At operation 606 of the method 600, the unique code may be facilitated to be printed by the processor. The printing of the unique code may be facilitated for purpose of affixing the printed unique code on an exterior of the sealed container. As explained with reference to FIG. 3, the unique code may be printed on an exterior of the sealed container or on a label configured to adhere on the exterior of the sealed container.

At operation 606 of the method 600, the one or more images and the unique code may be facilitated by the processor to be stored in a database. The one or more images may be retrievable from the database on providing the unique code to the database. Retrieval of the one or more images from the database is explained in reference to FIGS. 4-5 and is not explained herein again. Another method for facilitating verification of contents of the sealed container is explained with reference to FIG. 7.

Figure 7:
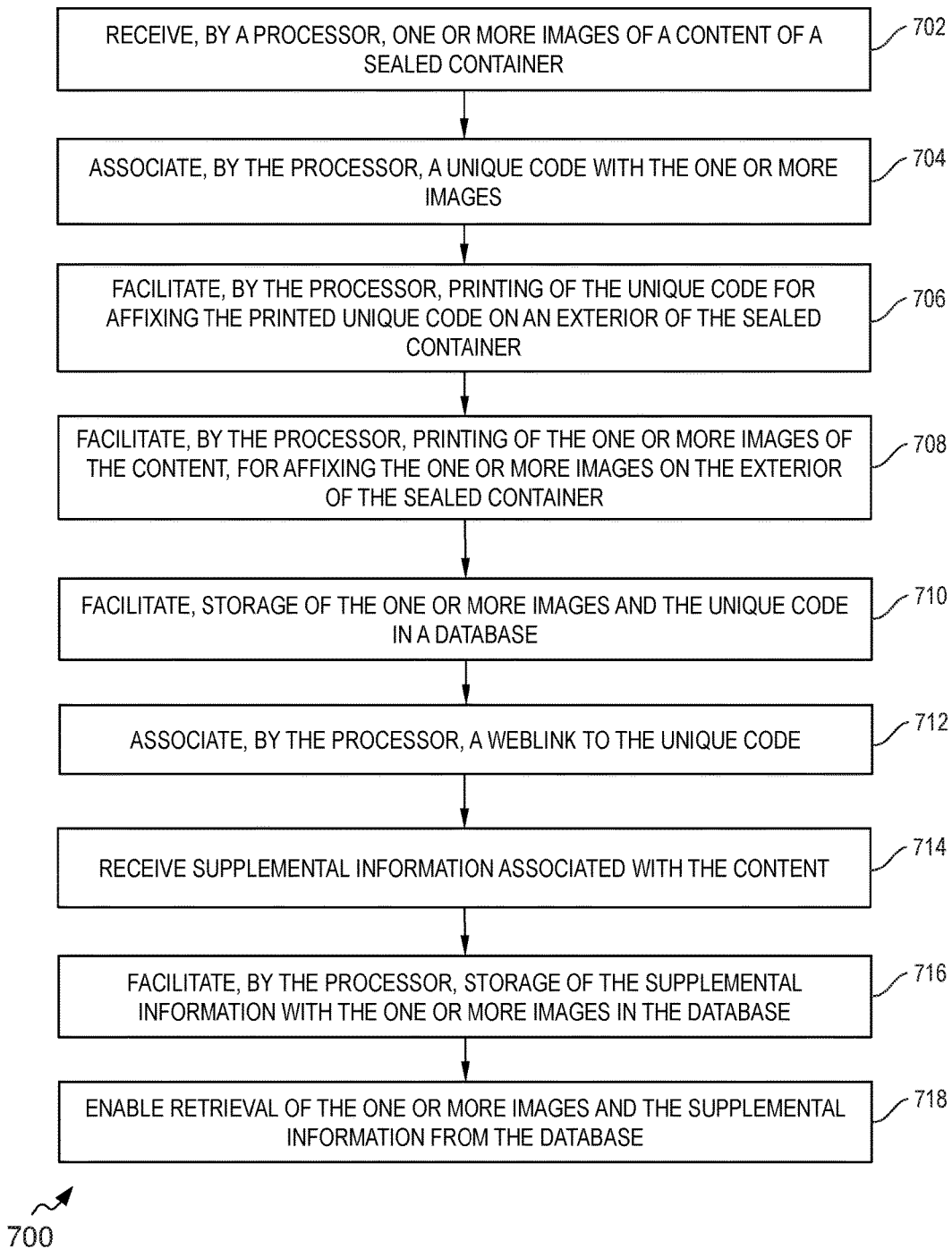
FIG. 7 is a flowchart illustrating a method for facilitating verification of a content of a sealed container in accordance with an example embodiment.

FIG. 7 is a flow diagram of an example method 700 for facilitating content verification of sealed containers, in accordance with another embodiment of the invention. The method 700 starts at operation 702.

At operation 702 of the method 700, one or more images of contents of a sealed container may be received by a processor such as the processor 202 of the content verification system 102 explained with reference to FIG. 2. The one or more images of the contents may be captured prior to sealing the contents in the sealed container. The one or more images may comprise a high-resolution image.

At operation 704 of the method 700, a unique code may be associated with the one or more images of the contents by the processor. The unique code may be one of a two-dimensional code, an alphanumeric code, and an encrypted code, configured to uniquely identify the one or more images of the contents.

At operation 706 of the method 700, the unique code may be facilitated to be printed by the processor. The printing of the unique code may be facilitated for purpose of affixing the printed unique code on an exterior of the sealed container. As explained with reference to FIG. 3 the unique code may be printed on an exterior of the sealed container or on a label configured to adhere on the exterior of the sealed container. The unique code maybe printed in a human-readable format or a machine-readable format or a combination of both.

At operation 708 of the method 700, the one or more images may be facilitated by the processor, to be printed, for purpose of affixing the one or more images on an exterior of the sealed container. For example, the one or more images may be printed directly on the exterior of the sealed container. In another example, the one or more images may be printed on an adhesive material such as a label, a sticker, stick-on paper and the like, where the adhesive material is adhered to the exterior of the sealed container, as explained in reference to FIG. 3. The printed one or more images may be altered in resolution and size in comparison to the captured one or more images. For example, a printed image may have a smaller size and lesser resolution based on a size of the sealed container and printing resolution available, respectively. In a non-limiting example, a captured image may have resolution as high as 10 mega pixels, however a printed image may be a printed copy of an image having resolution less than or equal to 5 mega pixel resolution. Further, the printed one or more images maybe a subset of the captured one or more images. For example, a single image of the captured one or more images may be printed on the sealed container based on a space constraint and other packaging constraints of the sealed container.

At operation 710 of the method 700, the one or more images and the unique code are stored in a database. The database may comprise of one or more storage locations for storing the one or more images and the unique code. A data representation of a storage location is explained in FIG. 4. The database may further include an input/output interface for receiving the one or more images and the unique code via a network from the processor of the content verification system 102.

At operation 712 of the method 700, a weblink may be associated with the unique code, by the processor. The weblink may point to the storage location of the database where the unique code and the one or more images are stored.

At operation 714 of the method 700, supplemental information associated with the content may be received by the processor. The processor may authenticate an input device which provides the supplemental information. For example, authorized personnel using an input device such as a keyboard may input the supplemental information into the content verification system. The processor, may authenticate the input by a password or such means before accepting the supplemental information. The supplemental information may include a name and description of the contents, date of manufacture of the contents, and ancillary information pertaining to the contents.

At operation 716 of the method 700, the processor may facilitate a storage of the supplemental information with the one or more images in the database. Storage of the supplemental information in the storage location of the database is explained with reference to FIG. 4 and is not explained herein again.

At operation 718 of the method 700, the processor may enable retrieval of the one or more images and the supplemental information from the database. The one or more images may usually be retrieved on receiving a request from an electronic device, where the request may be initiated in response to a user seeking to verify the contents of the sealed container. A method for verification of contents of a sealed container is explained with reference to FIG. 8

Figure 8:
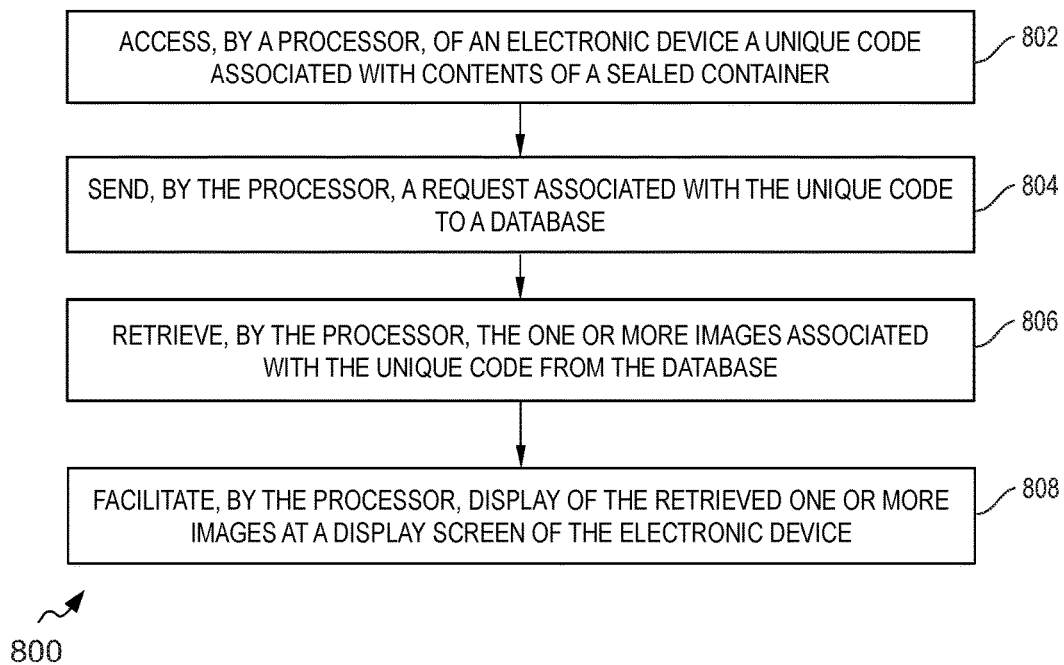
FIG. 8 is a flowchart illustrating a method for verifying a content of a sealed container in accordance with another example embodiment.

FIG. 8 is a flow diagram of an example method 800 for verifying content of sealed containers, in accordance with an embodiment of the invention. The method 800 depicted in the flow diagram may be executed by, for example, an electronic device 108 explained with reference to FIGS. 1B to 5. Operations of the flowchart, and combinations of operation in the flowchart, may be implemented by, for example, hardware, firmware, a processor, circuitry and/or a different device associated with the execution of software that includes one or more computer program instructions. The operations of the method 800 are described herein with help of the electronic device 108. For example, one or more operations corresponding to the method 800 may be executed by a processor, such as the processor 502 (refer FIG. 5) of the electronic device 108. Although the one or more operations are explained herein to be executed by the processor 502 alone, it is understood that the processor 502 is associated with a memory (not shown in FIG. 5), which is configured to store machine executable instructions for facilitating the execution of the one or more operations. The operations of the method 800 can be described and/or practiced by using an electronic device other than the electronic device 108. The method 800 starts at operation 802.

At operation 802 of the method 800, a unique code associated with contents of a sealed container may be accessed by the processor of the electronic device. The unique code may be affixed on an exterior of the sealed container. In an example embodiment, an image of the unique code may be captured by an image capturing device coupled to or embodied within the electronic device. The captured image of the unique code may be communicated to the processor. The unique code may be accessed when a user of the electronic device seeks to verify the contents of the sealed container. In an example embodiment, the user may be a customer engaged in purchasing the contents of the sealed container and may seek to verify the contents prior to making the purchase.

At operation 804 of the method 800, a request associated with the unique code may be sent by the processor, to a database that stores one or more images of the contents corresponding to the unique code. The one or more images of the contents may be captured prior to sealing the contents in the sealed container. The one or more images may include at least one high-resolution image of the contents.

At operation 806 of the method 800, the one or more images associated with the unique code, may be retrieved by the processor, from the database. In an example embodiment, an input/output interface of the database may provide the one or more images to the processor upon receiving the request comprising the unique code from the processor of the electronic device.

At operation 808 of the method 800, the retrieved one or more images may be facilitated by the processor to be displayed on a display screen associated with the electronic device. For example, the high-resolution image so retrieved may be viewed on the display screen. The user may perform a zoom operation on the high-resolution image in order to view a magnified image of the contents. The magnified image may enable the user to inspect a quality of the contents with higher precision and detail. On inspecting the quality of the contents, the user may choose to buy the contents of the sealed container. Another method for verification of contents of a sealed container is explained with reference to FIG. 9.

Figure 9:
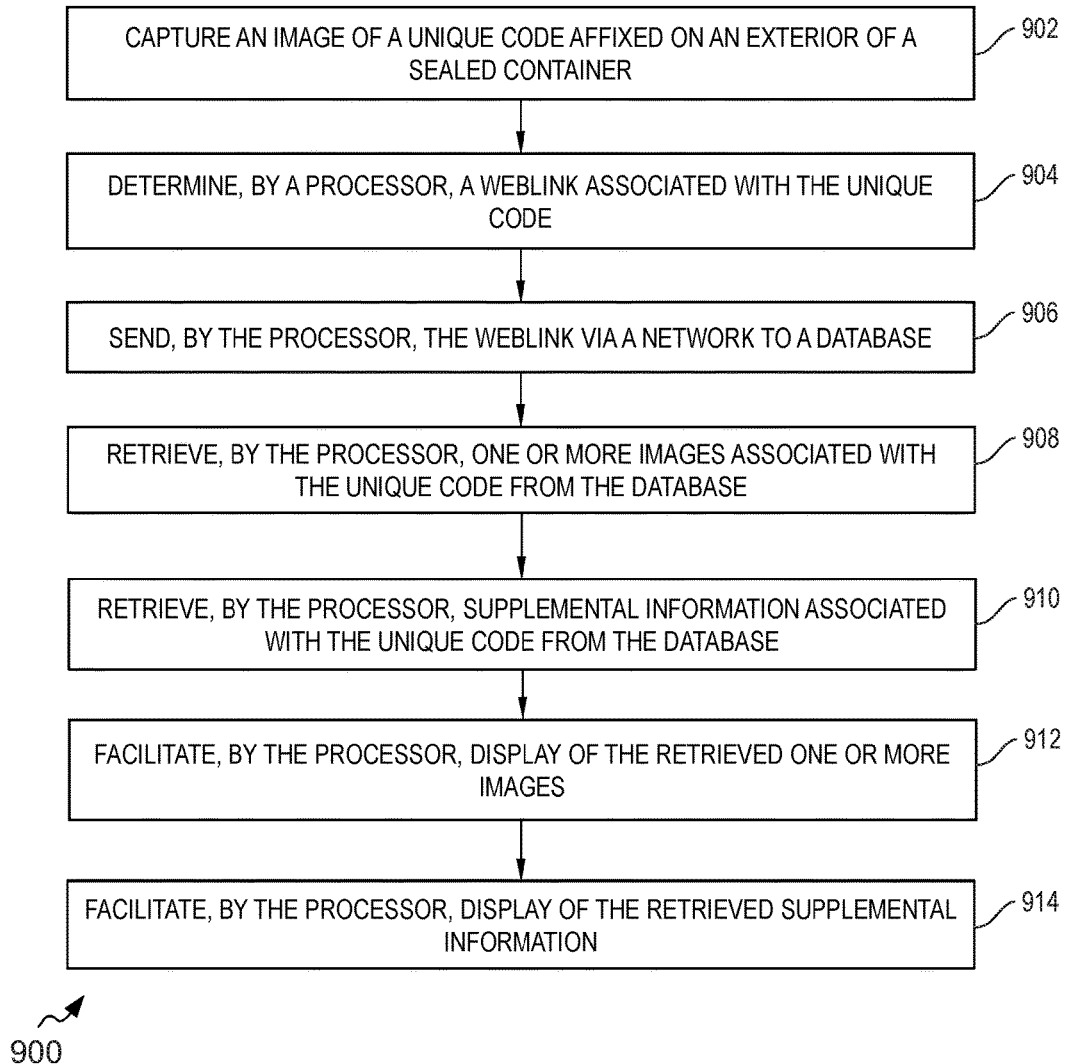
FIG. 9 is a flowchart illustrating a method for verifying a content of a sealed container in accordance with another example embodiment.

FIG. 9 is a flow diagram of an example method 900 for content verification of sealed containers, in accordance with another embodiment of the invention. The method 900 starts at operation 902.

At operation 902 of the method 900, an image of a unique code affixed on an exterior of a sealed container may be captured by an image capturing device. The unique code may be associated with contents of the sealed container. The contents of the sealed container are to be verified using an electronic device. In an example embodiment, the electronic device may be operated by a user engaged in purchasing the contents of the sealed container. The user may seek to verify or view the contents of the sealed container prior to the purchase. In order to verify the contents, the image of the unique code may be captured by the image capturing device. The image capturing device may be a part of the electronic device or may be communicatively coupled to the electronic device. The captured unique code may be communicated to a processor of the electronic device.

At operation 904 of the method 900, on accessing the unique code, a weblink associated with the unique code may be determined by the processor. The weblink may point to a storage location of a database, where one or more images of the contents of the sealed container may be stored. The electronic device may be communicate with the database via a network as explained with reference to FIG. 1B.

At operation 906 of the method 900, the weblink may be communicated, by the processor, via the network to the database for accessing the one or more images of the contents and supplemental information corresponding to the unique code. An input/output interface of the database may be configured to receive the weblink and provide the one or more images and the supplemental information to the electronic device. The one or more images of the contents may be captured prior to sealing the sealed container. Further, the one or more images may include a high-resolution image.

At operation 908 of the method 900, the one or more images associated with the unique code may be retrieved by the processor from the database.

At operation 910 of the method 900, the supplemental information associated with the unique code may be retrieved by the processor from the database. In an example embodiment, the supplemental information includes a name and description of the contents, date of manufacture of the contents, and ancillary information.

At operation 912 of the method 900, the one or more images may be facilitated, by the processor, to be displayed on a display screen of the electronic device. The user may perform a magnify operation on the displayed one or more images to view the contents depicted in the one or more images clearly in order to judge a quality of the contents prior to making the purchase.

At operation 914 of the method 900, the supplemental information may be facilitated by the processor to be displayed on the display screen of the electronic device. The supplemental information may be displayed to provide the user with additional information on the contents, so that the user may make an informed decision in respect to the purchase of the contents.

The disclosed methods 600, 700, 800 and 900 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer or image processor embedded in a device, such as a laptop computer, net book, web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 10:
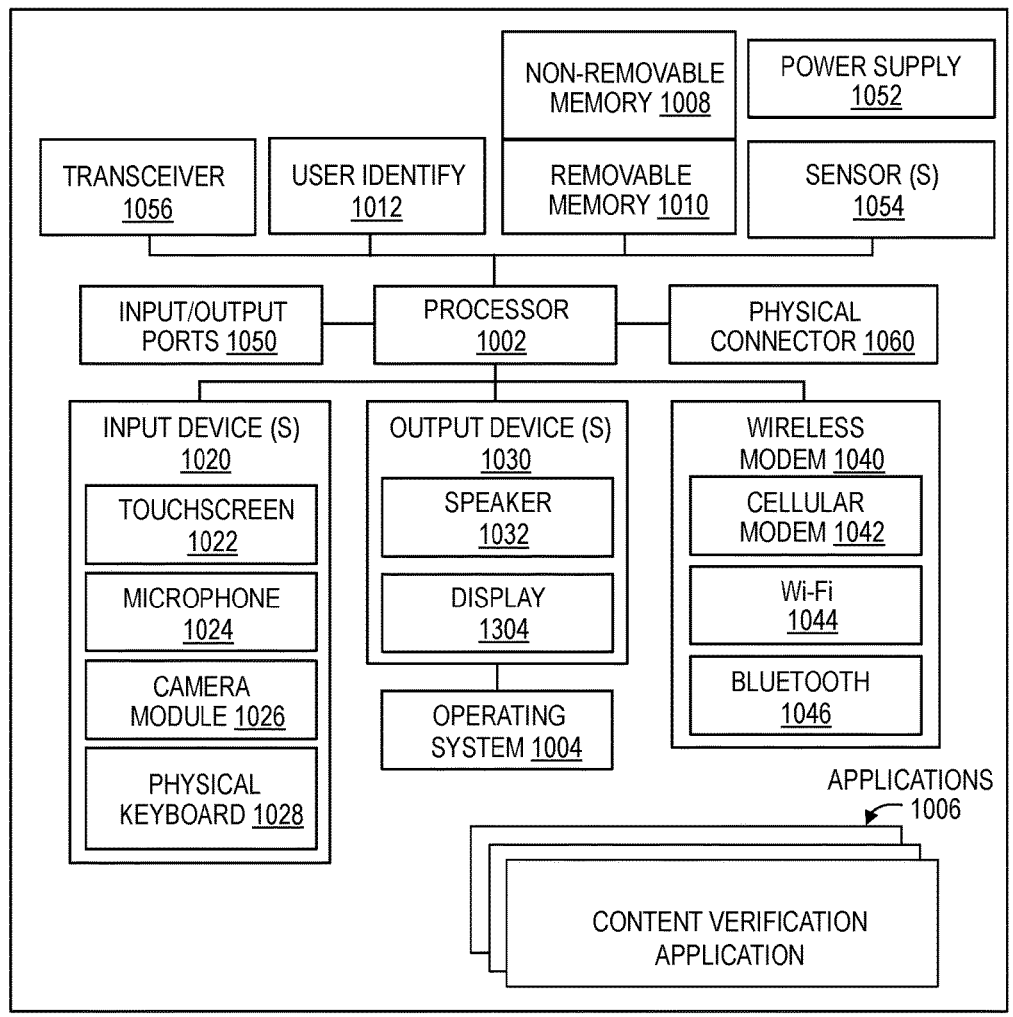
FIG. 10 illustrates an example of a device capable of implementing example embodiments described herein.

Referring now to FIG. 10, a schematic block diagram of a device 1000 is shown that is capable of implementing embodiments of techniques for facilitating verification of contents of sealed containers as described herein. The device 1000 may be an example of the content verification system 102 and/or the electronic device 108. It is noted that the device 1000 as illustrated and hereinafter described is merely illustrative of one type of device and should not be taken to limit the scope of the embodiments. As such, it should be appreciated that at least some of the components described below in connection with the device 1000 may be optional and thus in an example embodiment may include more, less or different components than those described in connection with the example embodiment of FIG. 10. As such, among other examples, the device 1000 could be any of device from among fixed electronic devices, such as desktop computers and electronic kiosks, to mobile electronic devices, such as for example, personal digital assistants (PDAs), mobile televisions, cellular phones, tablet computers, laptops, mobile computers or any combination of the aforementioned, and other types of communication or multimedia devices.

In at least one example embodiment, the device 1000 may be a personal electronic device such as a smartphone, a tablet, a personal digital assistant and the like in which a content verification application may be installed and running. For example, a user such as a customer of a retail store, may carry the electronic device to a facility such as a store, retail outlet, a medical shop, and the like where contents are sold in sealed containers. In such a scenario, a captured image of a unique code printed on an exterior of a sealed container may be received by the content verification application installed on the electronic device and processed via components of the electronic device. In some scenarios, the content verification application may be accessed through a web browser installed on a personal electronic device of the customer or downloaded through an online application store onto the personal electronic device. In another example embodiment, the device 1000 may correspond to a kiosk device pre-installed with the content verification application.

In at least one example embodiment, the device 1000 may be an example of the content verification system 102 which is used to capture images of the contents prior to sealing the container, and interact with peripheral devices such as printer for printing of the one or more images and interact with the database for storage of the images along with supplemental information.

It may be noted that the computer program code corresponding to the content verification application installed in the device 1000 may not only be configured to display one or more user interfaces associated with the content verification application, but also cause the electronic device to perform various functionalities associated with verifying contents of sealed containers, such as for example, accessing, by a processor of the electronic device, a unique code associated with contents of a sealed container, the unique code affixed on an exterior of the sealed container; sending, by the processor, a request associated with the unique code to a database that stores one or more images of the content corresponding to the unique code, the one or more images of the content captured prior to sealing the content in the sealed container; retrieving, by the processor, the one or more images associated with the unique code from the database; and facilitating, by the processor, display of the retrieved one or more images at a display screen associated with the electronic device. The verification of the contents of the sealed containers may be performed by the device 1000 as explained with reference to FIGS. 1A-1B to 9 and is not explained again herein.

The illustrated device 1000 includes a controller or a processor 1002 (e.g., a signal processor, microprocessor, ASIC, or other control and processing logic circuitry) for performing tasks such as signal coding, data processing, image processing, input/output processing, power control, and/or other functions. An operating system 1004 controls the allocation and usage of the components of the device 1000 and support for one or more applications programs (see, applications 1006), such as the content verification application, that implements one or more of the innovative features described herein. In addition to content verification application, the applications 1006 may include common mobile computing applications (e.g., telephony applications, email applications, calendars, contact managers, web browsers, messaging applications) or any other computing application.

The illustrated device 1000 includes one or more memory components, for example, a non-removable memory 1008 and/or removable memory 1010. The non-removable memory 1008 can include RAM, ROM, flash memory, a hard disk, or other well-known memory storage technologies. The removable memory 1010 can include flash memory, smart cards, or a Subscriber Identity Module (SIM). The one or more memory components can be used for storing data and/or code for running the operating system 1004 and the applications 1006. Examples of data can include web pages, text, images, sound files, image data, video data, or other data sets to be sent to and/or received from one or more network servers or other devices via one or more wired or wireless networks. The device 1000 may further include a user identity module (UIM) 1012. The UIM 1012 may be a memory device having a processor built in. The UIM 1012 may include, for example, a SIM, a universal integrated circuit card (UICC), a universal subscriber identity module (USIM), a removable user identity module (R-UIM), or any other smart card. The UIM 1012 typically stores information elements related to a mobile subscriber. The UIM 1012 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA).

The device 1000 can support one or more input devices 1020 and one or more output devices 1030. Examples of the input devices 1020 may include, but are not limited to, a touch screen 1022 (e.g., capable of capturing finger tap inputs, finger gesture inputs, multi-finger tap inputs, multi-finger gesture inputs, or keystroke inputs from a virtual keyboard or keypad), a microphone 1024 (e.g., capable of capturing voice input), a camera module 1026 (e.g., capable of capturing still picture images and/or video image frames) and a physical keyboard 1028. Examples of the output devices 1030 may include, but are not limited to a speaker 1032 and a display 1034. Other possible output devices (not shown) can include piezoelectric or other haptic output devices. Some devices can serve more than one input/output function. For example, the touch screen 1022 and the display 1034 can be combined into a single input/output device.

In an embodiment, the camera module 1026 may include a digital camera capable of facilitating image/video capture. In some implementations, the camera module 1026 may include two or more cameras, for example, a front camera and a rear camera positioned on two sides of the device 1000. As such, the camera module 1026 includes all hardware, such as a lens or other optical component(s), and software for capturing images and/or creating a video stream from a captured video. Alternatively, the camera module 1026 may include the hardware needed to view the video, while a memory device of the device 1000 stores instructions for execution by the processor 1002 in the form of software to create a video stream from a captured video. In an example embodiment, the camera module 1026 may further include a processing element such as a co-processor, which assists the processor 1002 in processing image frame data and an encoder and/or decoder for compressing and/or decompressing image data. In an embodiment, the camera module 1026 may provide live image data (viewfinder image data) to the display 1034.

A wireless modem 1040 can be coupled to one or more antennas (not shown in FIG. 10) and can support two-way communications between the processor 1002 and external devices, as is well known in the art. For example, the communication may include provisioning notifications to the coordinator, establishing a chat link between the participant and the coordinator and the like. The wireless modem 1040 is shown generically and can include, for example, a cellular modem 1042 for communicating at long range with the mobile communication network, a Wi-Fi-compatible modem 1044 for communicating at short range with an external Bluetooth-equipped device or a local wireless data network or router, and/or a Bluetooth-compatible modem 1046. The wireless modem 1040 is typically configured for communication with one or more cellular networks, such as a GSM network for data and voice communications within a single cellular network, between cellular networks, or between the mobile device and a public switched telephone network (PSTN).

The device 1000 can further include one or more input/output ports 1050, a power supply 1052, one or more sensors 1054 for example, an accelerometer, a gyroscope, a compass, or an infrared proximity sensor for detecting the orientation or motion of the device 1000, a transceiver 1056 (for wirelessly transmitting analog or digital signals) and/or a physical connector 1060, which can be a USB port, IEEE 1394 (FireWire) port, and/or RS-232 port. The illustrated components are not required or all-inclusive, as any of the components shown can be deleted and other components can be added.

Various example embodiments offer, among other benefits, techniques for efficient verification of contents of sealed containers. The methods and systems disclosed herein overcome several drawbacks of conventional mechanisms by providing the user with actual images of the content of the sealed container. Further, disclosed methods enable the user to view high-resolution images of the content on personal electronic devices, thereby enabling the user to judge a quality of the content prior to making a purchase of the content. Further, provisioning of supplementary information associated with the content to the user, enable the user to make informed decisions with respect to the purchase.

It is noted that various example embodiments as described herein may be implemented in a wide variety of devices, network configurations and applications.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the operations of any of the methods described herein when the program is run on a computer and where the computer program may be embodied on a computer readable medium. Examples of tangible storage media include computer storage devices such as disks, thumb drives, memory etc. The software can be suitable for execution on a parallel processor or a serial processor such that the method operations may be carried out in any suitable order, or simultaneously.

Alternatively, or in addition, the functionality described herein (such as the content verification instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A method, comprising:
   receiving, by a processor, one or more images of a content of a sealed container, the one or more images of the content captured prior to sealing the content in the sealed container;
   receiving, by the processor, supplemental information associated with the content from an input device, the supplemental information comprising name and description of the content, a date of manufacture of the content, and ancillary information, the description of the content comprising place of origin of the content, a place of manufacture, and name of manufacturer;
   authenticating the input device;
   associating, by the processor, a unique code with the one or more images and with the supplemental information of the content;
   associating, by the processor, a weblink to the unique code;
   facilitating, by the processor, printing of the unique code for affixing the printed unique code on an exterior of the sealed container;
   facilitating, by the processor, printing a subset of one or more images for affixing the subset on the exterior of the sealed container, wherein the subset of the one or more images is altered in resolution and size based on size and packaging constraint of the sealed container and also, in comparison to the one or more images before printing;
   facilitating, by the processor, storage of the one or more images, the supplemental information and the unique code in a database such that the one or more images and the supplemental information are retrievable from the database via web access provided to the database through the weblink associated with the unique code;
   receiving a request from an electronic device to access the one or more images and the supplemental information through the weblink;
   retrieving the one or more images using the unique code; and
   providing the one or more images for display on the electronic device.

2. The method as claimed in claim 1, wherein affixing the printed unique code on the exterior of the sealed container comprises printing the unique code on the exterior of the sealed container using three dimensional printing.

3. A method, comprising:
   accessing, by a processor of an electronic device, a unique code associated with a content of a sealed container by capturing an image of the unique code, wherein the unique code is affixed on an exterior of the sealed container and is a machine readable code;
   sending, by the processor, a request associated with the unique code to a database that stores one or more images and supplemental information of the content corresponding to the unique code, the one or more images of the content captured prior to sealing the content in the sealed container, wherein the request is sent to the database by identifying a weblink associated with the unique code and using the weblink to access the database, the supplemental information comprising name and description of the content, a date of manufacture of the content, and ancillary information, the description of the content comprising place of origin of the content, a place of manufacture, and name of manufacturer;
   retrieving, by the processor, the one or more images and the supplemental information associated with the unique code from the database; and
   facilitating, by the processor, display of the retrieved one or more images and the supplemental information at a display screen associated with the electronic device.

4. A sealed container, comprising:
   a subset of one or more images of a content of the sealed container provided at an exterior of the sealed container;
   a scratch and sniff label configured to enable a user to scratch and sniff an odor representing the odor of the content; and
   a unique code provided at the exterior of the sealed container; wherein the unique code is configured to be used by an electronic device to retrieve the one or more images and supplemental information of the content stored in a database, the supplemental information comprising name and description of the content, a date of manufacture of the content, and ancillary information, the description of the content comprising place of origin of the content, a place of manufacture, and name of manufacturer.

* * * * *